United States Patent

Brown et al.

[11] 3,795,439
[45] Mar. 5, 1974

[54] PHOTOGRAPHIC FILMSTRIP

[75] Inventors: Gordon P. Brown, Rochester; David N. Schwardt, Webster, both of N.Y.

[73] Assignee: Eastman Kodak Company, Rochester, N.Y.

[22] Filed: Dec. 8, 1971

[21] Appl. No.: 205,853

[52] U.S. Cl............... 352/235, 352/236, 352/241
[51] Int. Cl............................................. G03c 1/76
[58] Field of Search .......... 352/236, 235, 241, 232; 156/157, 507

[56] References Cited
UNITED STATES PATENTS

| | | |
|---|---|---|
| 2,606,409 | 8/1952 | Gordon............................ 352/235 |
| 1,383,745 | 7/1921 | Newman............................ 156/157 |
| 3,408,726 | 11/1968 | Brown............................... 156/157 |
| 1,319,209 | 10/1919 | Conord............................. 352/235 |

Primary Examiner—Samuel S. Matthews
Assistant Examiner—Russell E. Adams, Jr.

[57] ABSTRACT

A photographic filmstrip having predefined image areas regularly spaced from one another at a uniform pitch distance includes discontinuities for facilitating the splicing of two of such filmstrips together end-to-end in such a manner that, when spliced, the endmost image area of one strip will be spaced from the adjacent image area of the other strip by a distance which is a multiple of the pitch distance.

3 Claims, 7 Drawing Figures

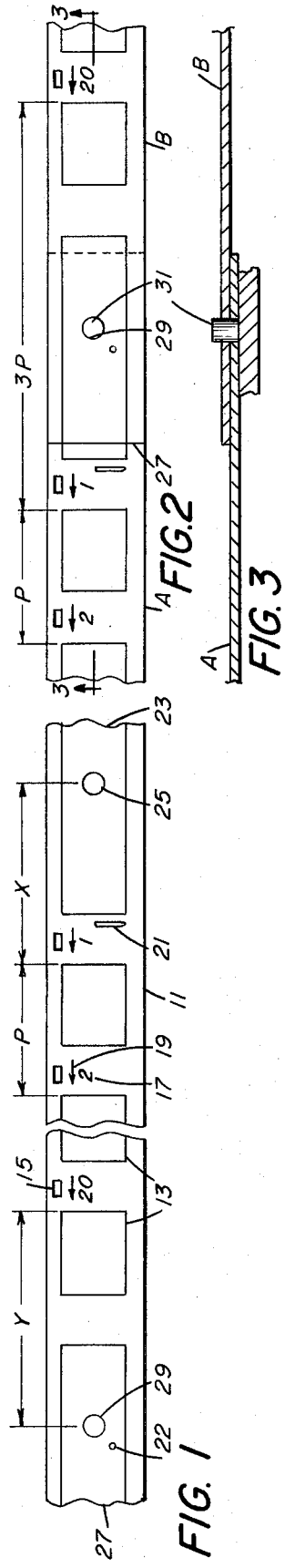
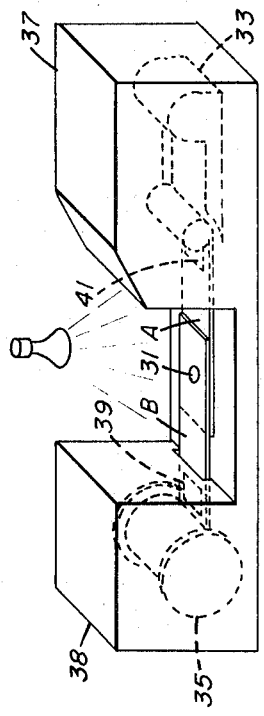
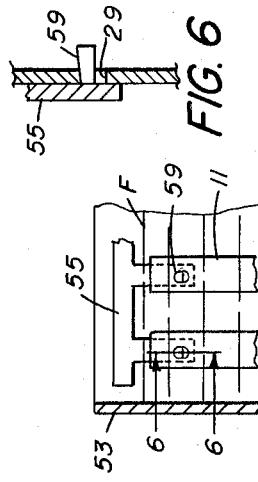
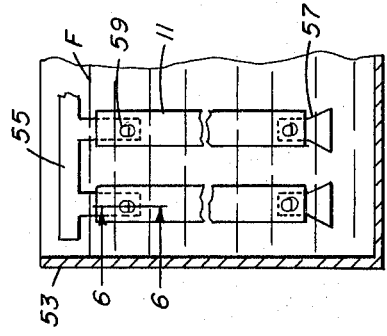
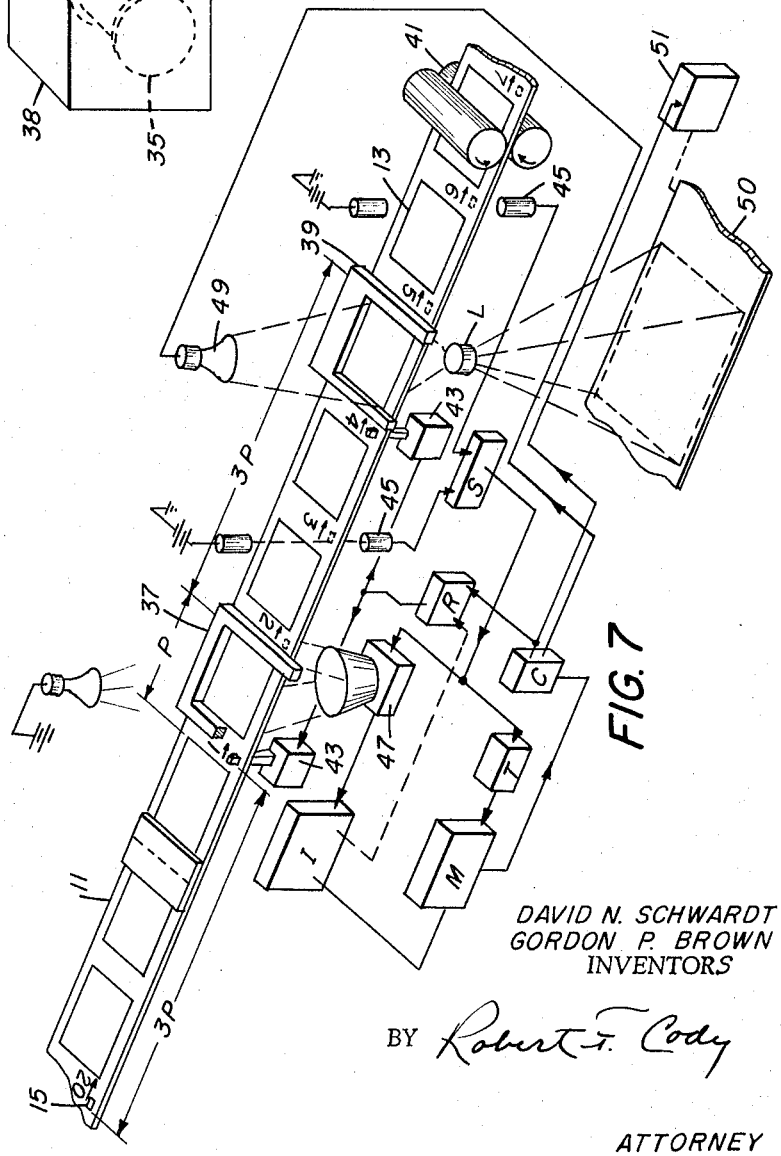
DAVID N. SCHWARDT
GORDON P. BROWN
INVENTORS
BY Robert F. Cody
ATTORNEY

3,795,439

PHOTOGRAPHIC FILMSTRIP

BACKGROUND OF THE INVENTION

1. Field of the Invention

The present invention relates to a photographic filmstrips of the type having predefined, regularly-spaced image areas. More particularly, the invention provides an improved format for such filmstrip which facilitates splicing and other film-handling chores, and enhances the sequencing and timing of various operations of photographic processing and printing apparatus.

2. Description Relative to the Prior Art

The advent filmstrips having predefined, regularly-spaced image areas or frames (see U.S. Pat. No. 3,086,862) expedited the operation of apparatus, such as photographic printers: because each such image area is now defined by a pre-exposed border, each area can be provided with a corresponding metering perforation located in predetermined relationship thereto. Such an arrangement permits an image area to be precisely located at, say, a print gate of a photograpic printer simply by engaging its associated perforation with a fixed stop. Since adjacent image areas are spaced from each other by a uniform pitch distance, it is possible to add a scanning station spaced upstream from the print station by a multiple of such pitch distance so that when one image area is aligned for printing, a second image area is aligned for scanning, and both operations may proceed concurrently.

Prior to the introduction of the above system, it had long been the practice not to present film to the printer or other processing apparatus as discrete filmstrips of, for example, 12 or 20 frames, but rather to splice a series of such filmstrips together to form a single continuous strip. To form a continuous strip out of a series of filmstrips having predefined image areas requires accurate splicing if a pitch distance (or multiple thereof) relationship is to be maintained between the trailing image area of one filmstrip and the leading image area of the succeeding filmstrip, thereby to facilitate the aforementioned printing operation. In a search for some means for accurately registering successive filmstrips to accomplish such in-pitch splicing, it was decided to utilize the leading and trailing film metering perforations of the respective filmstrips by, for example, inserting registration pins therethrough. Such an approach was not, however, totally satisfactory in that the metering perforations had previously been engaged by a metering pawl in the camera and would thereafter be engaged by the stop(s) at the printer work station. To engage the metering perforations again, i.e., at the splicing station, might produce sufficient cumulative deformation of the perforations to cause filmstrip misalignment at the printer work station. Also, such perforations are located so close to their respective image areas as to create a likelihood of smudging or otherwise damaging the image areas while registering the filmstrip for splicing. Furthermore, with such a method, the leading and trailing image areas of the successive spliced filmstrips must be the same distance apart as the adjacent image areas of a single discrete filmstrip; and such close spacing — as will be evident below — requires the splicing operation to be carried out in the dark . . . whereas, by means of the invention, the in-pitch splicing of exposed sensitized filmstrips may be done in ordinary room light.

SUMMARY OF THE INVENTION

It has been found that in-pitch white light splicing can be achieved by providing first and second registration points at, respectively, the leading and trailing ends of a photographic filmstrip, and by locating such points in a certain predetermined relationship to, respectively, the leading and trailing image areas of the filmstrip.

In accordance with a preferred embodiment of the invention, such registration points comprise first and second perforations so spaced from their associated image areas that when the first perforation of one filmstrip is registered with the second perforation of a like filmstrip, a three-pitch distance separates a point on the leading image area of the one filmstrip from a corresponding point on the trailing image area of the like filmstrip.

Object(s) of the invention: To provide a specially-arranged format for a filmstrip, whereby not only are various film handling operations facilitated, but also, whereby the format lends itself readily to a special rack design for use in film processing procedures.

BRIEF DESCRIPTION OF THE DRAWINGS

FIG. 1 depicts a photographic filmstrip having predefined image areas and including an embodiment of the subject invention, FIG. 2 depicts the filmstrip of FIG. 1 in registration with a like filmstrip in accordance with the subject invention, FIG. 3 is a cross-section along line 3—3 of FIG. 2, FIG. 4 is a representation of a splicing station for use with the subject invention, FIG. 5 depicts a use of the subject invention in combination with a photographic processor, FIG. 6 is a cross-sectional view of a portion of FIG. 5, and FIG. 7 is a representation of the subject invention in combination with a photographic printer.

DESCRIPTION OF THE PREFERRED EMBODIMENT

In FIG. 1, there is shown a photographic filmstrip 11 of the type having predefined frames or image areas 13 uniformly spaced therealong at a predetermined pitch distance P, as measured from a point on one image area to a corresponding point on an adjacent image area. Each image area has an associated film metering perforation 15 located in predetermined spaced relation thereto. In the interval between adjacent image areas, there is provided a system of frame identifying numerals 17 and arrows 19 serving to identify the respective image areas. Cut lines 21 may also be provided in the intervening space between frames to assist in cutting the filmstrip into smaller segments for return to the customer, and also to assist in accurately aligning the filmstrip at various work stations so that appropriate operations may be performed thereon. The filmstrip may also include a code perforation 22, preferably at one end of the filmstrip, to indicate which of two possible lengths of film (12 or 20 exposures, for example) is present.

Adjacent the leading film end 23 (i.e., the end nearest the leading frame number one), there is provided a first registration means conveniently in the form of a discontinuity, such as a perforation 25, which is spaced from a point on the leading frame by a distance X. Adjacent the opposite, or trailing, film end 27 is a second registration means in the form of a perforation 29, which is spaced a distance Y from a point on the trailing frame (frame number twenty in this case), which point corresponds to the aforementioned point on the leading frame. Perforations 25 and 29 are desirably so located that the sum of the distances X and Y is equal to a multiple of the pitch distance P (in the instant case, a multiple of three).

In accordance with the above arrangement, and as shown in FIGS. 2 and 3, when a first filmstrip A is aligned longitudinally with a second filsmtrip B of like nature, the perforation 25 of the filmstrip A may be placed in register with the perforation 29 of the filmstrip B by, for example, placing the perforations over a registration pin 31. As shown in FIG. 2, when the two filmstrips are so registered, a point on the trailing image area (i.e., frame number 20) of the filmstrip B will be in a certain pitch distance relationship with a corresponding point on the leading image area (frame number 1) of the filmstrip A; specifically, such points will be spaced apart by a distance equal to three times the pitch distance P.

FIG. 4 illustrates a way in which the above pitch distance relationship may be advantageously employed in splicing together several discrete filmstrips into a single strip for continuous processing. FIG. 4 diagrammatically shows a portion of a splicing station, at which exposed film A embodying the subject invention is (partially) removed from a film cartridge 33 and spliced in pitch distance relationship to the trailing end of a like filmstrip B to form a continuous strip of film which may then, for example, be wound on a storage reel 35. During splicing, both the cartridge 33 and the reel 35 may be advantageously enclosed within respective light-tight chambers 37 and 38 with only the respective filmstrip ends, exclusive of the image areas, being exposed to ambient white light. This arrangement is made possible by the fact that, when such ends are in registry, a three-pitch distance exists between corresponding points on adjacent image areas 39 and 41, thereby allowing sufficient room for the operator to manipulate the ends of the strips even though the image areas are retained within the respective darkened chambers. Of course, it should be understood that a pitch distance multiple of more than three could be employed; however, to do so would generate needless film wasteage. Following registration, the film ends may be clamped, cut, and spliced together, and the filmstrip B wound onto the reel 35 after a suitable shield (not shown) has been fitted in place to protect the film from light rays during advancement.

The practice of FIG. 4 ... which is made possible by means of the specially-disposed registration perforations 25 and 29 ... constitutes a significant advance over the prior practice of splicing wherein all frames in the composite strip are a given pitch distance apart. The practice of FIG. 4 can be done in room light, whereas prior filmstrip splicing procedures had to be done in the dark, because filmstrip leaders and trailers were discarded, thus making filmstrip handling relatively difficult.

FIG. 7 depicts a filmstrip according to the subject invention in combination with a photographic printer having spaced apart scan and print stations 37 and 39. The filmstrip 11 is advanced by rollers 41 until suitably located retractable pawls 43 engage respective metering perforations 15 to stop such advancement and positioning film image areas 13 at the scan and print stations. Signals from photocells 45 are applied to a detector circuit S which detects when the filmstrip is correctly positioned for printing, whereupon the detector S applies a signal to activate a scanner 47 to determine the correct exposure for the image area which is positioned at the scan station 37. The scanner output is applied to a computer I which determines the printing exposure to be used for the just-scanned frame. Upon completion of such computations, a signal is applied by the computer I to a pawl release R, and the computed exposure is applied to memory device M. Concurrently with the above operation, a signal from the detector S causes, by means of a trigger T, the memory device M to apply the previously calculated exposure determination for the image area then positioned at print station 39 to a printer control C. The printer control C actuates the printer lamp 49 for an appropriate length of time so as to transfer an enlarged image to photosensitive paper 50 via the lens system L of the printer. Following such exposure, a signal is sent by the control C to a paper advance 51 and to the pawl release R. When the pawl release R has received signals from both the exposure computer I and the printer control C, the pawls 43 are retracted, and the film 11 is advanced by the rollers 41, whereupon the above operations are repeated on the next-succeeding image areas. It should be understood that in the above arrangement, the same aforementioned pitch distance relationship that exists between the respective leading and trailing image areas of the spliced-together filmstrips also exists between print station 39 and scan station 37 so as to assure that at all times at least one of said stations will be in alignment with a film image area ... which is to say that the timing and sequencing of the printer operations are facilitated.

FIG. 5 depicts an additional use which is contemplated for the registration perforations of the invention. A tank-type processor has processing fluid F contained in a tank 53. Above the tank 53 is a movable rack 55 from which discrete filmstrips 11 are suspended for immersion in the fluid F. In prior systems, spring clamps were used to secure the filmstrip to the rack and also to attach a weight 57 to the free end of the filmstrip, but such clamps so deformed the filmstrip ends as to interfere with subsequent splicing operations. As a result of the invention, both the rack 55 and weights 57 may be modified to include pins 59 for insertion through the perforations 29 and 25, so as to securely engage the filmstrip without causing substantial deformation thereof.

The invention has been described in detail with particular reference to preferred embodiments thereof, but it will be understood that variations and modifications can be effected within the spirit and scope of the invention.

We claim:

1. In a given filmstrip having a leading end, a trailing end, means for defining a plurality of metering perforations longitudinally spaced at uniform intervals along said filmstrip, and a plurality of predefined like image areas residing at regular, longitudinally-spaced locations along said filmstrip so as to define a predetermined pitch distance between adjacent image areas as measured from a point on one of said adjacent image areas to a corresponding point on the other of said adjacent image areas, the improvement wherein:

said given filmstrip is further provided with first and second registration means at, respectively, the leading and trailing ends of said given filmstrip, said registration means being so located that when the first registration means of said given filmstrip is placed in register with a second registration means of a like second filmstrip that is longitudinally aligned with said given filmstrip, the distance between a point on the leading image area of said given filmstrip and a corresponding point on the trailing image area of said second filmstrip will be substantially equal to three times said pitch distance.

2. The invention of claim 1 wherein said first registration means comprises a discontinuity adjacent said leading filmstrip end.

3. The invention of claim 2, wherein said second registration means comprises a discontinuity adjacent said trailing filmstrip end.

* * * * *